United States Patent Office 3,294,788
Patented Dec. 27, 1966

3,294,788
HYDRAZONES OF 1-AMINO-4-DIPHENYL-
ACETYLPIPERAZINES
John W. Cusic, Skokie, and Peter Yonan, Chicago, Ill.,
assignors to G. D. Searle & Co., Chicago, Ill., a corporation of Delaware
No Drawing. Filed Apr. 21, 1964, Ser. No. 361,588
5 Claims. (Cl. 260—240)

The present invention relates to a group of hydrazones of 4-substituted 1-aminopiperazines. More particularly, it relates to compounds having the following general formula

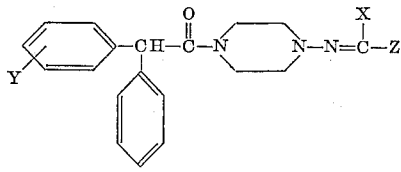

wherein Y is selected from the group consisting of hydrogen and halogen; X is selected from the group consisting of hydrogen, lower alkyl, and phenyl; and Z is selected from the group consisting of lower alkyl, phenyl, tolyl, halophenyl, hydroxyphenyl, methylenedioxyphenyl, methoxyphenyl, cyanophenyl, pyridyl, methylpyridyl, and ferrocenyl.

The lower alkyl radicals referred to above contain up to 6 carbon atoms and can be exemplified by radicals such as methyl, ethyl, propyl, and butyl. The halogen radicals referred to above are exemplified by fluorine, chlorine, bromine, and iodine. The halophenyl radicals referred to above include fluorophenyl, chlorophenyl, bromophenyl, and iodophenyl.

The compounds of the present invention can be prepared by the condensation of an aldehyde or a ketone with the appropriate 1-substituted 4-aminopiperazine in an inert solvent. A trace of acetic acid can be included to catalyze the reaction. Although 2-propanol is a particularly useful solvent for the reaction, ethanol or other alcohols can also be used. In addition, aromatic hydrocarbons such as benzene or toluene are also useful as solvents in this type of a reaction although, in this case, it is desirable to remove the water from the reaction mixture as it formed. The reaction is promoted by the use of elevated temperatures.

Important intermediates in the above reaction are hydrazines having the following general structural formula

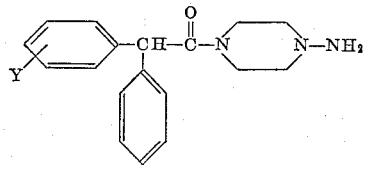

wherein Y is defined as above. Compounds of this type are prepared by reacting 1-nitrosopiperazine with the appropriate diphenylacetyl chloride to give the corresponding amide and then selectively reducing the nitroso group with an agent such as zinc and acetic acid to give the desired hydrazine.

The compounds of this invention are useful because of their pharmacological properties. In particular, the present compounds possess anti-ulcer activity which is demonstrated by their inhibition of ulceration in the Shay rat. In addition, the present compounds possess activity as antiatherogenic agents which is demonstrated by their inhibition of hepatic synthesis of cholesterol. The present compounds also show activity as anti-bacterial agents as shown by their inhibition of the growth of the organism *Diplococcus pneumoniae*.

The following examples are presented to further illustrate the present invention; they should not be construed as limiting it in spirit or in scope. In these examples, quantities are indicated in parts by weight and temperatures in degrees centigrade (° C.).

Example 1

A solution of 70 parts of diphenylacetyl chloride in 150 parts of chloroform is added portionwise to a solution of 110 parts of triethylamine in 375 parts of chloroform. The addition is exothermic. When the addition is complete, 36 parts of 1-nitrosopiperazine is added to the mixture portionwise while the temperature is kept at about 60–65° C. The mixture is heated at reflux for an additional 3 hours and then cooled and diluted with 150 parts of chloroform. The resultant chloroform solution is washed with water and dried and the solvent is evaporated under reduced pressure to leave a residual oil which later solidifies. The solid is then washed with ether to give 1-nitroso-4-diphenylacetylpiperazine melting at about 149–151° C. Recrystallization of this solid from a mixture of chloroform and hexane gives a product melting at about 151–152° C.

A solution is prepared from 30 parts of 1-nitroso-4-diphenylacetylpiperazine and 420 parts of glacial acetic acid and this solution is heated to 50° C. The solution is diluted with 80 parts of water and then 50 parts of zinc dust is added portionwise over a period of about 30 minutes while the temperature is maintained at about 50–55° C. Stirring at this temperature is continued for an additional 15 minutes after the addition is complete. The hot mixture is then filtered and diluted with 500 parts of cold water and the resultant mixture is cooled in an ice bath while it is made alkaline with a solution of 300 parts of sodium hydroxide in 750 parts of water. The resultant alkaline mixture is extracted with 3 portions of chloroform and the combined chloroform extracts are dried and the solvent is evaporated. Ether is added to the resultant residue whereupon crystals form. The product thus obtained is 1-amino-4-diphenylacetylpiperazine and it melts at about 132–133° C.

If the above procedure is repeated using 1-nitrosopiperazine and 4-chlorodiphenylacetyl chloride as the reactants, the product obtained is 1-amino-4-(4-chlorodiphenylacetyl)piperazine. This compound has the following formula

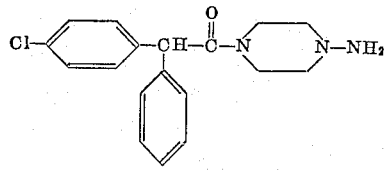

Example 2

To a solution of 3 parts of 1-amino-4-diphenylacetylpiperazine in 32 parts of 2-propanol, there is added 1.7 parts of piperonal and a drop of acetic acid. The resultant mixture is heated at the boiling point for about 5 minutes and then cooled. The product which precipitates is then separated. It is 1-piperonylideneamino-4-diphenylacetylpiperazine and it melts at about 140–141° C. This compound has the following formula

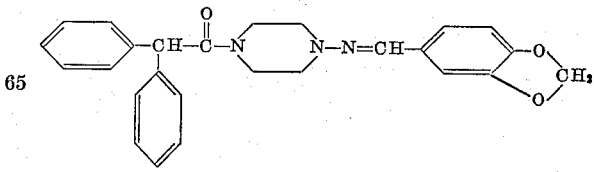

Example 3

If an equivalent quantity of 1-amino-4-(4-chlorodiphenylacetyl)piperazine is substituted for the 1-amino-4- diphenylacetylpiperazine and the procedure of Example 2 is repeated, the product is 1-piperonylideneamino-4-(4-chlorodiphenylacetyl)piperazine.

Example 4

The reaction of benzaldehyde with 1-amino-4-diphenylacetylpiperazine according to the procedure described in Example 2 gives 1-benzylideneamino-4-diphenylacetylpiperazine.

Similarly, the reaction of 4-hydroxybenzaldehyde with 1-amino-4-diphenylacetylpiperazine gives 1-(4-hydroxybenzylideneamino) - 4 - diphenylacetylpiperazine melting at about 217–218° C. 1-(3-hydroxybenzylideneamino)-4-diphenylacetylpiperazine is obtained in an analogous manner by using 3-hydroxybenzaldehyde.

The reaction of 4-cyanobenzaldehyde with 1-amino-4-diphenylacetylpiperazine likewise gives 1 - (4 - cyanobenzylideneamino)-4-diphenylacetylpiperazine melting at about 183–185° C.

Example 5

If an equivalent quantity of pyridine-4-carboxaldehyde is substituted for the piperonal and the procedure of Example 2 is repeated, the product is 1-(4-pyridylmethyleneamino)-4-diphenylacetylpiperazine melting at about 163–164° C. This compound has the following formula

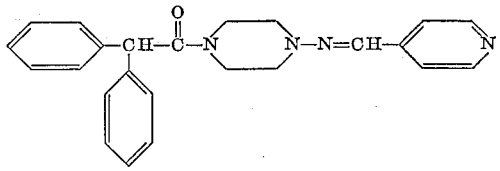

Example 6

An equivalent quantity of ferrocenecarboxaldehyde is substituted for the piperonal and the procedure of Example 2 is repeated. The product obtained is recrystallized from a mixture of benzene and hexane to give 1-ferrocenylmethyleneamino-4-diphenylacetylpiperazine melting at about 177–178° C. This compound has the following formula

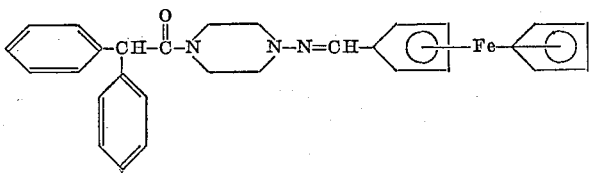

Example 7

A solution of 2 parts of 1-amino-4-diphenylacetylpiperazine in 10 parts of acetic anhydride is heated on a steam bath for 1 hour. The resultant mixture is then poured onto ice and made alkaline with dilute sodium hydroxide solution. The alkaline mixture is extracted with chloroform and the chloroform extract is dried and concentrated. A precipitate forms when ether is added to the chloroform concentrate. This solid is separated and recrystallized from a mixture of chloroform and ether to give 1-acetylamino-4-diphenylacetylpiperazine melting at about 172–173° C.

What is claimed is:

1. A compound of the formula

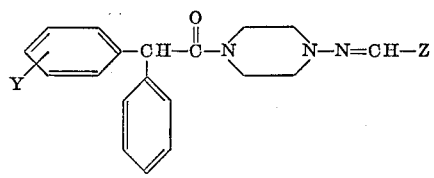

wherein Y is selected from the group consisting of hydrogen and halogen and Z is selected from the group consisting of phenyl, hydroxyphenyl, methylenedioxyphenyl, cyanophenyl, pyridyl, and ferrocenyl.

2. 1 - piperonylideneamino - 4 - diphenylacetylpiperazine.

3. 1 - (4 - hydroxybenzylideneamino) - 4 - diphenylacetylpiperazine.

4. 1 - (4 - pyridylmethyleneamino) - 4 - diphenylacetylpiperazine.

5. 1 - ferrocenylmethyleneamino - 4 - diphenylacetylpiperazine.

References Cited by the Examiner

UNITED STATES PATENTS 3,178,422  4/1965  Cusic et al. _____ 260—240

JOHN D. RANDOLPH, *Primary Examiner.*